United States Patent
Sugiyama

(10) Patent No.: US 7,409,326 B2
(45) Date of Patent: Aug. 5, 2008

(54) DESIGN SUPPORT METHOD AND DESIGN SUPPORT PROGRAM

(75) Inventor: Shin-ichi Sugiyama, Kashiwa (JP)

(73) Assignee: Canon Kabushiki Kaisha (JP)

( * ) Notice: Subject to any disclaimer, the term of this patent is extended or adjusted under 35 U.S.C. 154(b) by 352 days.

(21) Appl. No.: 11/243,567

(22) Filed: Oct. 5, 2005

(65) Prior Publication Data

US 2006/0074615 A1    Apr. 6, 2006

(30) Foreign Application Priority Data

Oct. 5, 2004    (JP)    ............... 2004-292604

(51) Int. Cl.
*G06F 17/10* (2006.01)
(52) U.S. Cl. .............. 703/2; 703/6; 700/230
(58) Field of Classification Search ............ 703/2, 703/6; 19/97.5; 700/112–114, 214, 228–230
See application file for complete search history.

(56) References Cited

U.S. PATENT DOCUMENTS 4,987,646 A * 1/1991 Leifeld et al. ............. 19/97.5
2004/0122551 A1* 6/2004 Ogawa et al. ............. 700/214

FOREIGN PATENT DOCUMENTS

| JP | 11-116133 A | 4/1999 |
|---|---|---|
| JP | 11-195052 A | 7/1999 |
| JP | 2000-222454 A | 8/2000 |
| JP | 2001-273337 A | 10/2001 |
| JP | 2002-297674 A | 10/2002 |
| JP | 2004-171426 A | 6/2004 |
| JP | 2004-189436 A | 7/2004 |
| JP | 2004-189446 A | 7/2004 |
| JP | 2004-258774 A | 9/2004 |

OTHER PUBLICATIONS

Kazushi Yoshida, Dynamic Analysis of Sheet Deformation Using Spring-Mass-Beam Model, Journal of the Japan Society of Mechanical Engineers, Series C, vol. 63, No. 615, Nov. 1997, Japan, pp. 1-18.

* cited by examiner

*Primary Examiner*—Russell Frejd
(74) *Attorney, Agent, or Firm*—Rossi, Kimms & McDowell, LLP

(57) ABSTRACT

A design support method for support design of a conveying path by simulating a behavior of a sheet-like flexible medium to be conveyed along a conveying path, includes: a conveying condition setting step of setting drive conditions of conveying rollers for conveying the flexible medium; a rotation direction display step of displaying rotation directions of the conveying rollers set with the drive conditions by the conveying condition setting step; a peripheral speed display step of displaying peripheral speeds of the conveying rollers set with the drive conditions by the conveying condition setting step; and a motion calculation step of acquiring time sequentially the behavior of the flexible medium in accordance with the drive conditions of the conveying rollers set by the conveying condition setting step.

12 Claims, 20 Drawing Sheets

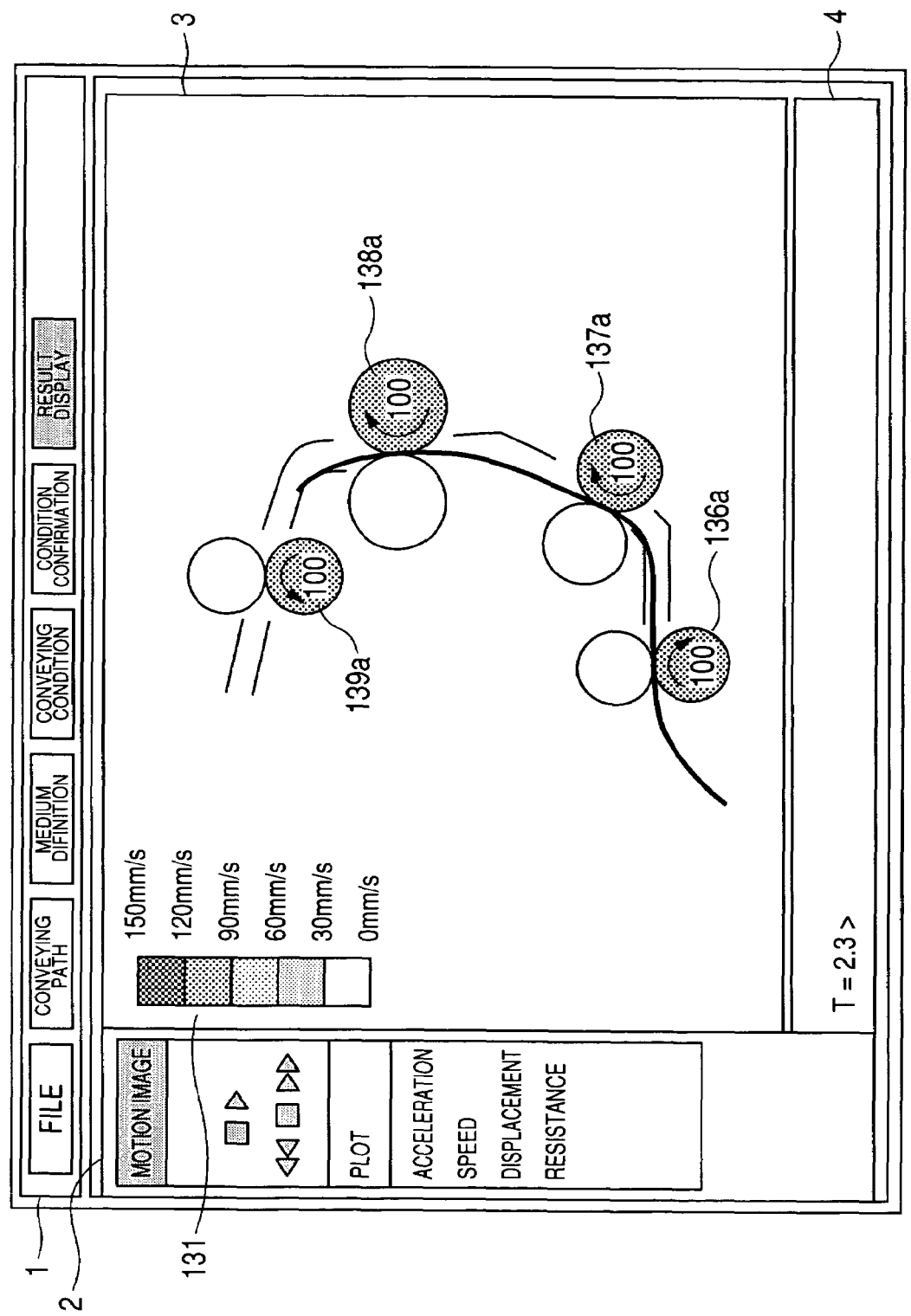

DESIGN SUPPORT METHOD AND DESIGN SUPPORT PROGRAM

BACKGROUND OF THE INVENTION

1. Field of the Invention

The present invention relates to a design support method and a design support program suitable for optimum design of a conveying path of an apparatus such as a copying machine, in which the behavior of a sheet member such as a sheet during conveying is analyzed by simulation.

2. Description of the Related Art

For design of a conveying path, it is preferable that the function of each designed component is studied under various conditions before it is actually manufactured, because the number of processes required for manufacturing and testing prototypes can be reduced and the development period and cost can be reduced. As techniques of making a computer simulate the behavior of a sheet on a conveying path in order to achieve the above-described objective, design support systems have been proposed as disclosed in Japanese Patent Application Laid-open Nos. H11-195052 and No. H11-116133. In the design support system, a flexible medium is expressed by finite elements by a finite element method, contacts of the flexible medium with guides and rollers along a conveying path are judged, and a motion equation is numerically solved to evaluate a conveying resistance and a contact angle of the flexible medium relative to guides and the like.

For example, a document by Kazushi YOSHIDA "The Japan Society of Mechanical Engineers (JSME) international Journal, 96-1530, C(1997), pp. 230-236" discloses an approach to improving a calculation speed by expressing a flexible medium simply by masses and springs.

A motion of a flexible medium is calculated through numerical time integral. Namely, a motion equation of a flexible medium expressed discretely by finite elements or a mass-spring system is established, an analysis time is divided into time steps having a finite width, and unknown values such as an acceleration, a speed and a displacement are sequentially calculated at each time step starting from time 0. Widely known as approaches to calculating these values are a Newmark-$\beta$ method, a Wilson-$\theta$ method, an Euler method, a Kutta-merson method and the like.

The time taken to solve a motion equation of a flexible medium through numerical time integral may be several hours depending upon a simulation model scale and analysis conditions. It is therefore necessary to confirm whether there is any input error of a simulation model before the calculation of numerical integral starts.

A simulation model has information input in a conveying path definition step and a conveying condition setting step. The input content of the conveying path definition step is mainly position information. A straight line guide is expressed by the coordinate values of a start point and an end point, an arc guide is expressed by the coordinate values of a center, a radius, a start point angle and an end point angle, and a conveying roller is expressed by the coordinate values of a center and a radius.

As the input content of the conveying condition setting step, a conveying guide is expressed by a friction coefficient of a flexible medium, a conveying roller is expressed by a friction coefficient of a flexible medium and time sequential roller drive conditions for conveying the flexible medium.

In confirming a simulation model, position information on a guide and a roller is drawn on a display as a line segment, an arc or a circle in accordance with input coordinate values. A user is not required to read input values and can perform a confirmation work visually easily. A friction coefficient of a flexible medium is input as numerical values in some cases. However, generally, as the material quality of an object of a model is designated, an attribute of each material quality preset in a database is automatically selected and input to a system. It is therefore unnecessary for a user to perform a confirmation work.

However, in confirming conveying roller drive conditions set for conveying a flexible medium (in the following, a paper sheet is used by way of example) along a conveying path under desired conveying conditions, the following steps are required to be executed, resulting in a problem that the confirmation work is complicated and hard to understand.

(Confirmation of Sheet Conveying Direction)

First, description will be made on a confirmation work method regarding a sheet conveying direction.

1. If a pair of rollers is modeled overriding a conveying path, one being defined as a driving roller and the other being defined as a driven roller, it is confirmed that the drive condition is set to which roller (confirmation of the driving roller).

2. If a sign added to a numerical value of a roller rotation speed input for the driving roller is defined that a positive sign indicates a counter-clockwise rotation and a negative sign indicates a clockwise rotation, it is confirmed that which of the positive and negative numerical values is input (confirmation of a rotation direction of the driving roller).

3. It is confirmed that a nip portion of the driving roller and driven roller, i.e., a sheet on the conveying path, is conveyed to which direction (confirmation of a conveying direction of a sheet by a conveying portion).

These works are required for the pair of rollers to confirm only the sheet conveying direction. These works are sequentially performed from a roller pair disposed at the upstream side of the conveying direction to a roller pair disposed at the downstream side. The sheet conveying direction of the whole model cannot be confirmed visually and intuitively.

(Confirmation of Sheet Conveying Speed)

Next, description will be made on a confirmation work method regarding a sheet conveying speed.

1. If a pair of rollers is modeled overriding a conveying path, one being defined as a driving roller and the other being defined as a driven roller, it is confirmed that the drive condition is set to which roller (confirmation of the driving roller).

2. It is confirmed what numerical value of a rotation speed is input to the driving roller.

3. It is confirmed what radius is set to the driving roller.

4. A roller peripheral speed is calculated (confirmation of a sheet conveying speed).

A rotation speed of the driving roller is generally expressed by a rotation number of a roller shaft per unit, time from the viewpoint of drive system design. Even if a linear speed of conveying a sheet with a nip portion of each roller pair is the same, an input rotation number is different if the roller radius of the driving roller of each roller pair is different. It is therefore difficult to judge a relative comparison between roller peripheral speeds of adjacent roller pairs on the upstream and downstream sides. There is a case wherein an error of input numerical values is found after analysis calculations by numerical time integral.

The confirmation works are further made complicated for a model having time sequentially different sheet conveying speeds and sheet conveying directions, such as a case wherein a sheet is conveyed at 200 mm/s to a certain time, the speed is increased to 400 mm/s from a certain time, and after conveying is stopped for a certain time period, the sheet conveying direction is reversed and then the sheet is conveyed at 600 mm/s.

As described above, it is difficult to grasp time sequentially, visually and intuitively the rotation directions and peripheral speeds of all rollers in a model with drive definitions.

SUMMARY OF THE INVENTION

In order to solve the above-described problems, an object of the present invention is to allow visual and intuitive understanding of conveying directions and conveying speeds of a flexible medium, through numerical simulation of the behavior of the flexible medium.

In order to achieve the above object, a design support method of the present invention of designing a conveying path by simulating a behavior of a sheet-like flexible medium to be conveyed along a conveying path, comprises: a conveying condition setting step of setting drive conditions of conveying rollers for conveying said flexible medium; a rotation direction display step of displaying rotation directions of said conveying rollers set with the drive conditions by said conveying condition setting step; a peripheral speed display step of displaying peripheral speeds of said conveying rollers set with the drive conditions by said conveying condition setting step; and a motion calculation step of acquiring sequentially the behavior of said flexible medium in accordance with said drive conditions of said conveying rollers set by said conveying condition setting step.

A computer-readable medium storing a computer program of the present invention for designing a conveying path by simulating a behavior of a sheet-like flexible medium to be conveyed along a conveying path, makes a computer execute: a conveying condition setting step of setting drive conditions of conveying rollers for conveying said flexible medium; a rotation direction display step of displaying rotation directions of said conveying rollers set with the drive conditions by said conveying condition setting step; a peripheral speed display step of displaying peripheral speeds of said conveying rollers set with the drive conditions by said conveying condition setting step; and a motion calculation step of acquiring sequentially the behavior of said flexible medium in accordance with said drive conditions of said conveying rollers set by said conveying condition setting step.

Other objects and features of the present invention will become apparent from the following description taken in conjunction with the accompanying drawings.

BRIEF DESCRIPTION OF THE DRAWINGS

FIG. 25 is an illustrative diagram of a moving image menu in a result display step according to a third embodiment.

DESCRIPTION OF THE PREFERRED EMBODIMENTS

Embodiments of the present invention will be described with reference to the accompanying drawings.

First Embodiment

Figure 1:
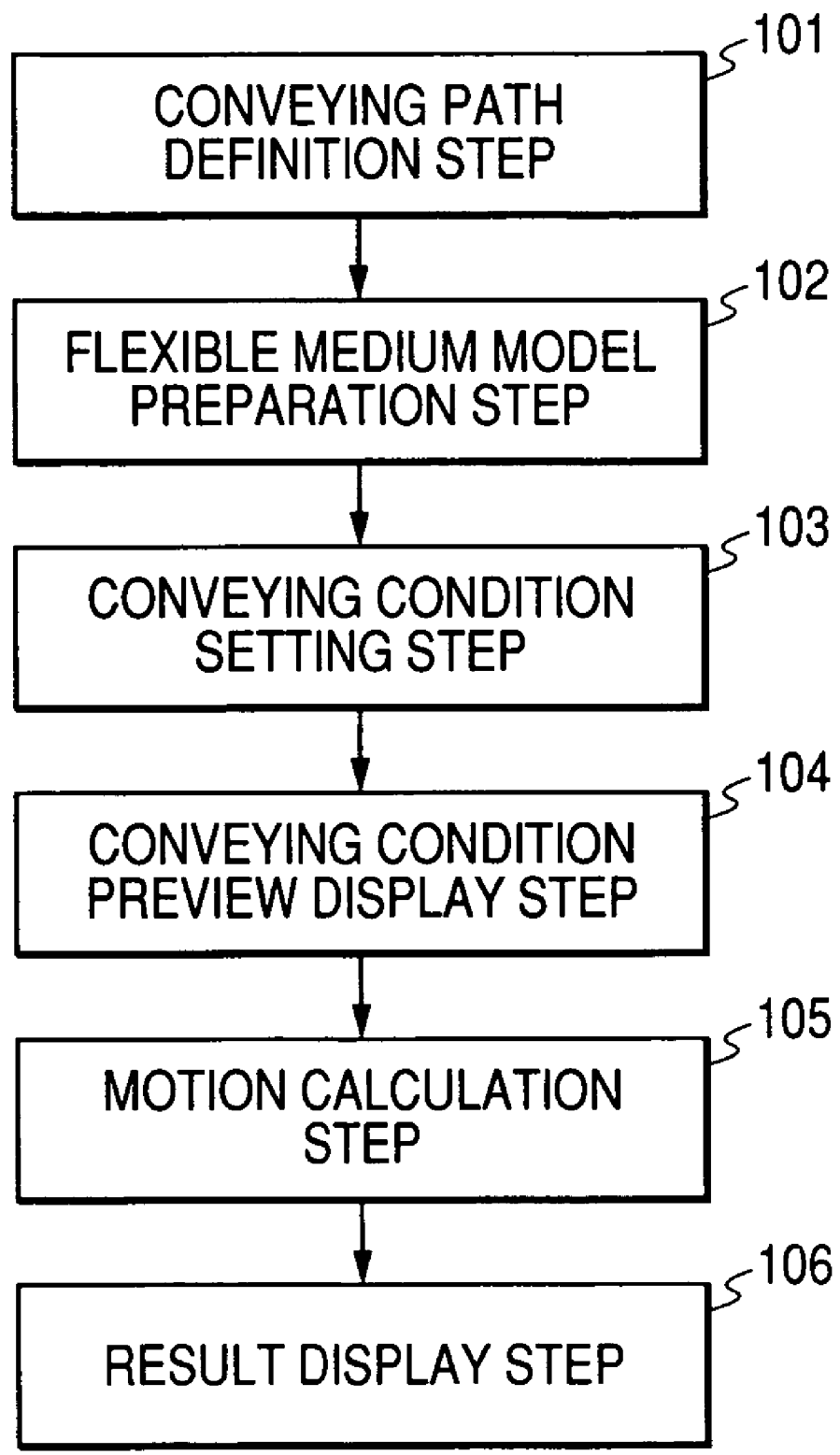
FIG. 1 is a flow chart illustrating a design support method according to an embodiment of the present invention.

FIG. 1 is a flow chart illustrating an example of an execution sequence of each step of a design support method according to the embodiment of the invention. As shown in FIG. 1, the design support method according to the embodiment of the invention sequentially executes six steps. The six steps include a conveying path definition step 101, a flexible medium model preparation step 102, a conveying condition setting step 103, a conveying condition preview display step 104, a motion calculation step 105 and a result display step 106.

A program for making a computer execute these steps is stored in a hard disk or a ROM of the computer of the design support system. The details of the process sequence will be described.

Figure 2:
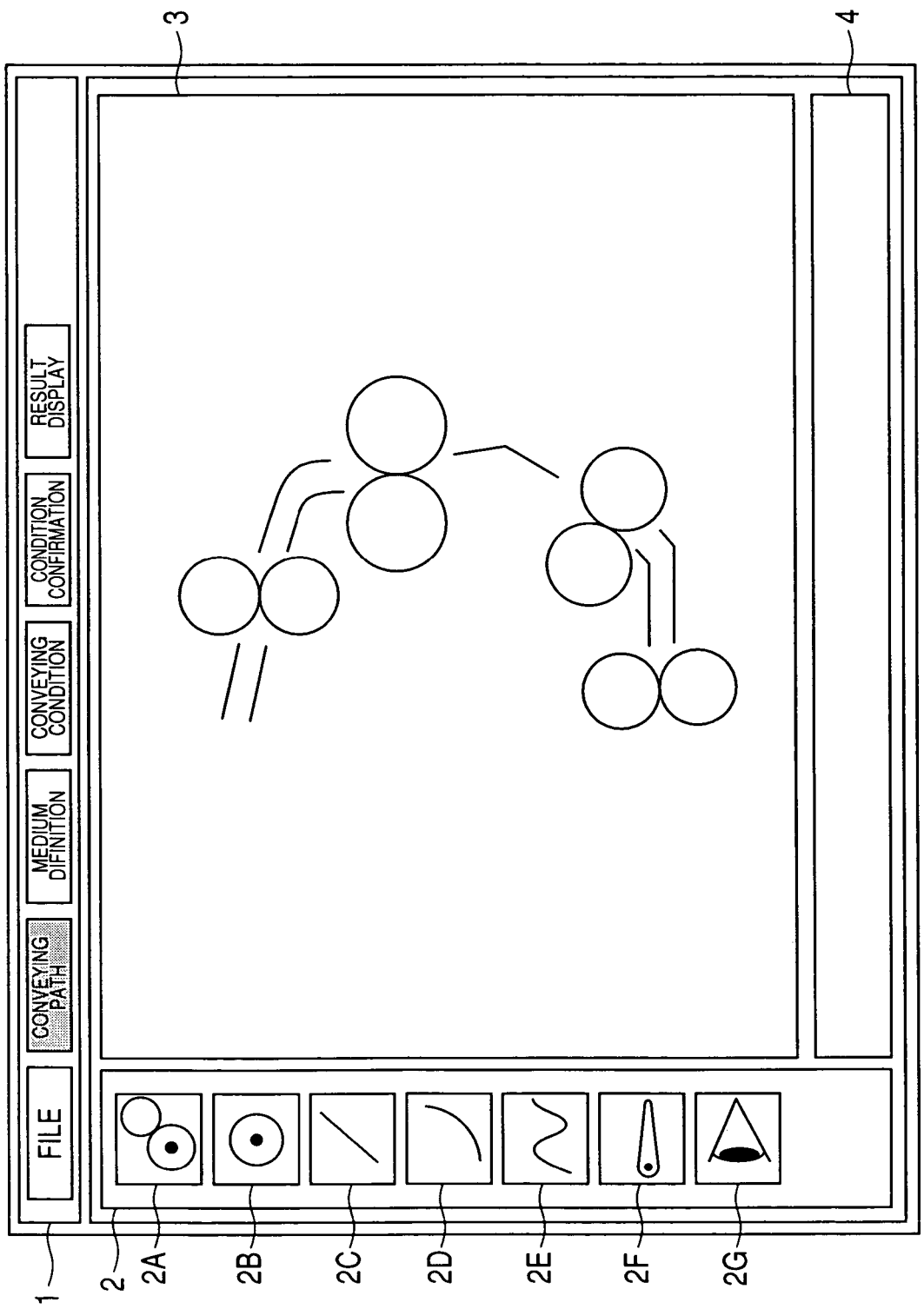
FIG. 2 is an illustrative diagram showing a screen layout of a conveying mechanism definition step.

FIG. 2 shows an example of a screen layout to be used by the design support method. The screen is constituted of a menu bar 1 for mainly switching between steps, a subsidiary configuration menu 2 of each step, a graphic screen 3 for displaying a defined conveying path and a result, and a command field 4 for outputting a system message and inputting necessary numerical values.

First, description will be made on the conveying path definition step 101. As a "conveying path" button in the menu bar 1 is depressed to define a conveying path, the subsidiary configuration menu 2 having a desired display area for the conveying path definition step 101 is displayed on the left side of the screen as shown in FIG. 2. The subsidiary configuration menu 2 can display a roller pair definition button 2A for defining a pair of two conveying rollers, a roller definition button 2B for defining a single roller and a linear guide definition button 2C for defining a linear conveying guide. The subsidiary configuration menu 2 can also display an arc guide definition button 2D for defining an arc conveying guide, a spline guide definition button 2E for defining a spline conveying guide with a spline curve, and a flapper definition button 2F for defining a flapper for branching the conveying path along which a flexible medium is conveyed. The subsidiary configuration menu 2 can also display a sensor definition button 2G for defining a sensor for sensing whether a flexible medium is at a predetermined position in the conveying path, and other buttons.

These buttons 2A to 2G correspond to the components constituting the conveying path of an actual copying machine or a printer. It is therefore desired that there are all components constituting the conveying path for a printing medium such as a paper sheet. As the definition of each constituent component is made by using the subsidiary configuration menu 2 and command field 4, the position and shape of each component are reflected on the graphic screen 3.

After the conveying path is defined by the conveying path definition step 101, the flow advances to the flexible medium model preparation step 102.

Figure 3:
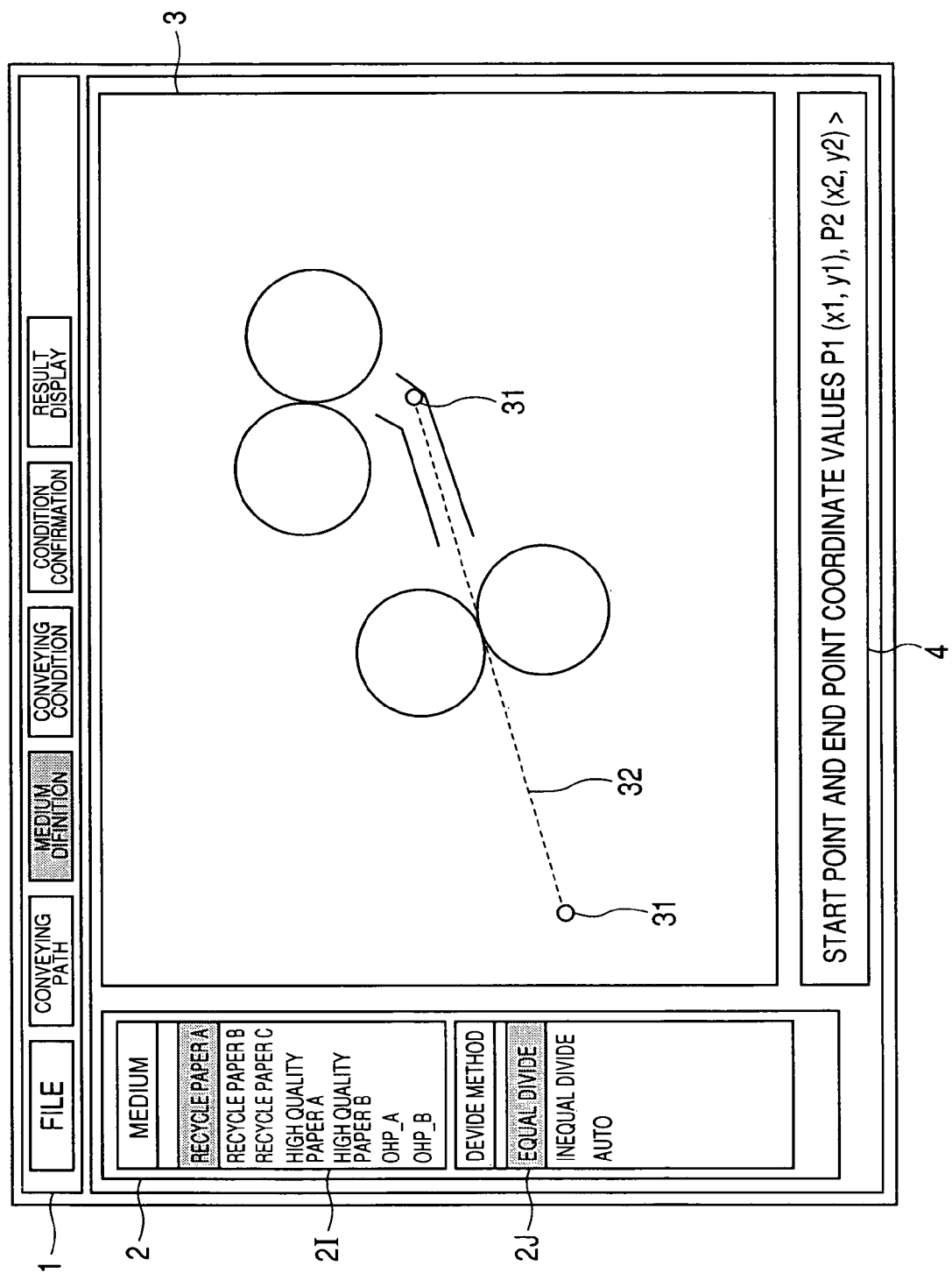
FIG. 3 is an illustrative diagram of a flexible medium definition step.

In this embodiment, the flow can advance to the flexible medium model preparation step 102 by selecting a "medium definition" button in the menu bar 1 shown in FIG. 2. FIG. 3 shows an example of the screen display in the flexible medium model preparation step. On the flexible medium model preparation screen displayed upon depression of the "medium definition" button in the menu bar 1, a medium type select screen 2I and a divide method select screen 2J are displayed in the subsidiary configuration menu 2.

In order to first decide the position of a flexible medium along the conveying path, a message urging to input the coordinate values of both ends of a flexible medium is displayed in the command field 4. The coordinate values can be entered by inputting numerical values in the command field 4 or by directly designating the numerical values on the graphic screen 3 with a pointing device such as a mouse of a computer of the design support system. When the coordinate values of both ends are defined, a straight line (broken line) interconnecting both ends 31 is drawn on the graphic screen 3 so that the user can confirm how the flexible medium is disposed along the conveying path.

Next, as the flexible medium is disposed, a message is displayed in the command field 4, the message urging to input a divide number n of the flexible medium expressed by the straight line (broken line) 32 and to be divided into a plurality of discrete spring-mass elements. The user enters a desired divide number n into the command field 4. In this embodiment, the divide number is assumed to be "10".

Typical sheet types are registered in advance in the medium type select screen 2I, and the sheet type to be subjected to calculation is clicked to select it.

Calculation parameters necessary for calculating a motion of the flexible medium along the conveying path are information on a Young's modulus, a density, a thickness and the like. These parameters are registered in a database for each sheet type displayed on the medium type select screen 2I. In the example shown in FIG. 3, recycle paper A is selected as the medium type, and this selection also selects a Young's modulus of 5409 Mpa, a density of $6.8 \times 10^{-7}$ kg/mm$^3$ and a sheet thickness of 0.0951 mm from the database.

Figure 4:
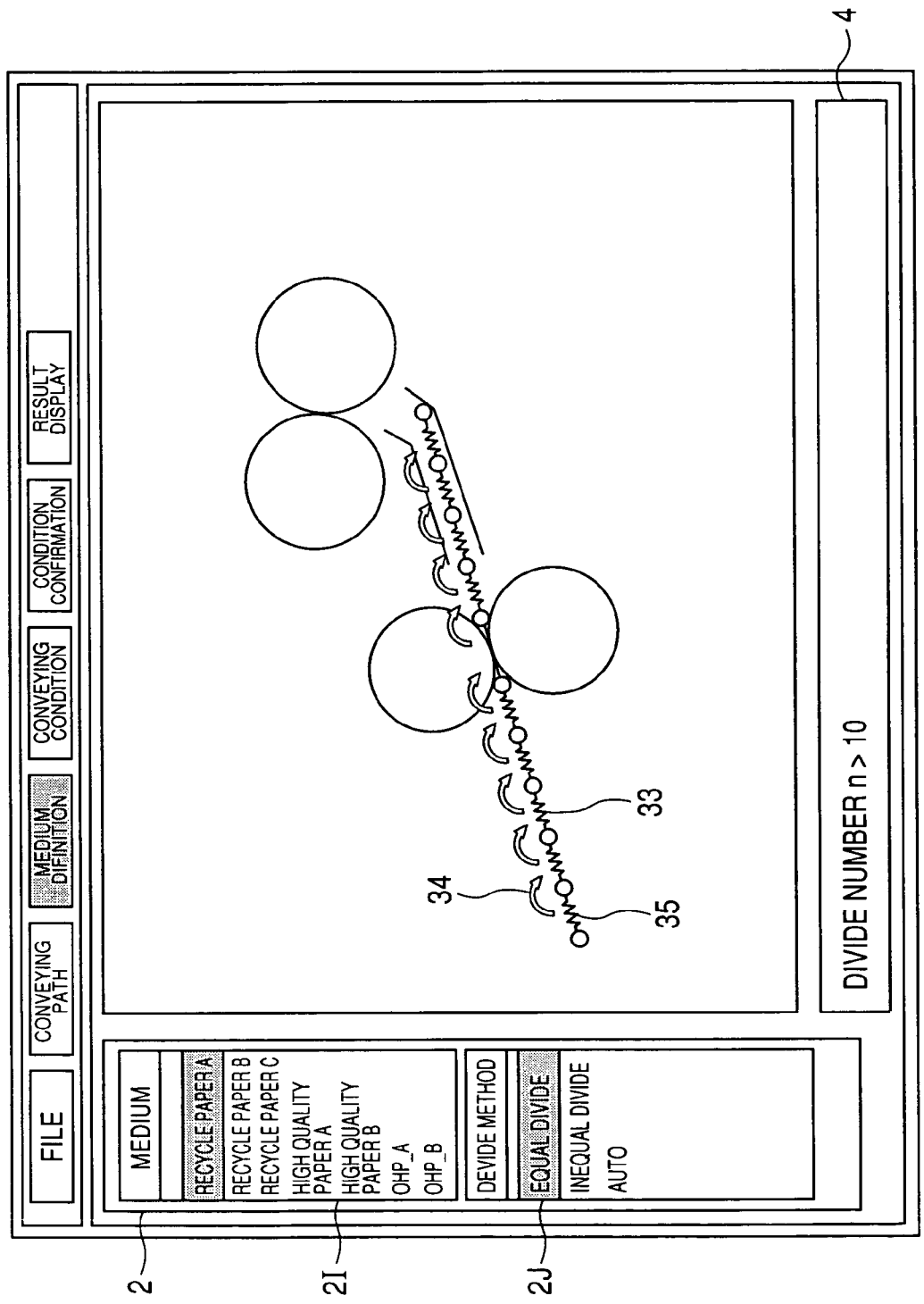
FIG. 4 is an illustrative diagram of a divide operation in the flexible medium definition step.

FIG. 4 shows an example of a flexible medium model preparation through equal divide. The disposed flexible medium can be equally divided by selecting an "equal divide" on the divide method select screen 2J of the "medium definition" screen shown in FIGS. 3 and 4.

More specifically, with this equal divide, the straight line (broken line) 32 displayed on the graphic screen 3 of FIG. 3 is displayed as mass points 33 disposed at positions equally dividing the straight line by "10". At the same time, a model coupling the mass points by rotation springs 34 and translation springs 35 is displayed on the graphic screen 3 (FIG. 4).

The rotation spring 34 coupling mass points represents flexural rigidity when a flexible medium is assumed to be an elastic body, and the translation spring 35 represents tensile rigidity. Both the spring constants can be derived from the elastic theories. A rotation spring constant Kr and a translation spring constant ks can be obtained from the following equations (1-1) and (1-2) by using a Young's modulus E, a width w, a sheet thickness t and a distance $\Delta$ between mass points:

$$kr = \frac{Ewt^3}{12\Delta L}, \quad ks = \frac{Ewt}{\Delta L}, \tag{1-1}$$

$$\Delta L = \frac{\sqrt{(x_2 - x_1)^2 + (y_2 - y_1)^2}}{n} \tag{1-2}$$

A mass m of a mass point can be calculated by the following equation (2) by using a length L, a width w, a sheet thickness t, a density $\rho$ and a divide number n:

$$m = Lwt\rho/(n-1) \tag{2}$$

With these processes, the flexible medium can be modeled as an elastic body reacting with flexural and tensile forces in the system.

After the flexible medium model preparation process 102 forms discrete spring-mass elements, the flow advances to the conveying condition setting step 103. The conveying condition setting step 103 defines drive conditions of driving rollers and friction coefficients of the flexible medium contacting conveying guides and rollers.

Figure 5:
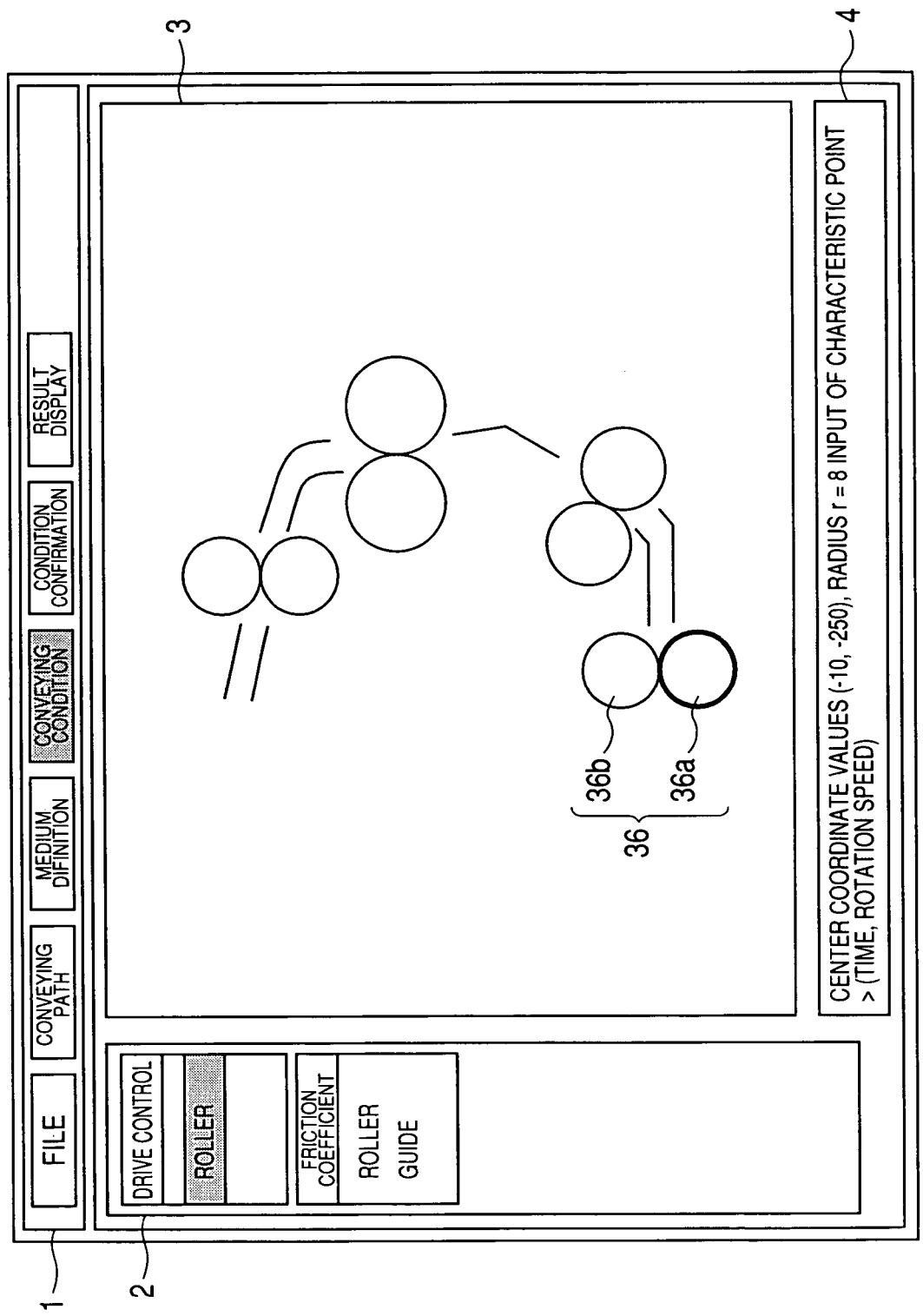
FIG. 5 is an illustrative diagram of a conveying condition definition step.

FIG. 5 is an illustrative diagram of the conveying condition setting step 103. As a "conveying condition" button of the menu bar 1 is depressed, a screen for designating driving conditions and friction coefficients is displayed in the subsidiary configuration menu 2. FIG. 5 shows an input example of roller driving control upon selection of a drive control "roller" in the subsidiary configuration menu 2. In the state that the drive control "roller" in the subsidiary configuration menu 2 is selected, rollers for which drive conditions are set are selected from conveying rollers displayed on the graphic screen 3.

FIG. 5 shows the state that a lower roller 36a of a roller pair positioned at the lowest is selected from roller pairs disposed on the graphic screen 3 (the shape of the roller 36a is displayed emphatically on the graphic screen 3 in FIG. 5). After the selection is completed, the coordinate value information and radius information input in the conveying path definition step 101 is displayed in the command field 4.

Next, characteristic points for expressing time sequential drive conditions are input in the command field 4. In this embodiment, the system is configured under the following definition conditions. It is urged to input a start T, an end T, T1, T2 and a rotation speed in the command field 4. A drive start time after the analysis calculation start time of "0" is entered in the start T, and a drive end time is entered in the end T.

The rotation speed is a rotation speed per one minute of a roller shaft to be defined, and the clockwise rotation direction is designated by a negative sign and the counter-clockwise direction is designated by a positive sign. If it takes a certain time until a desired rotation speed is reached, numerical values in the unit of second are entered in T1 and T2. For example, if "1" is entered in T1, a desired rotation speed is obtained after one second from the start T, whereas if "2" is entered in T2, the rotation speed is lowered before one second before the end T to stop at the end T.

Figure 6:
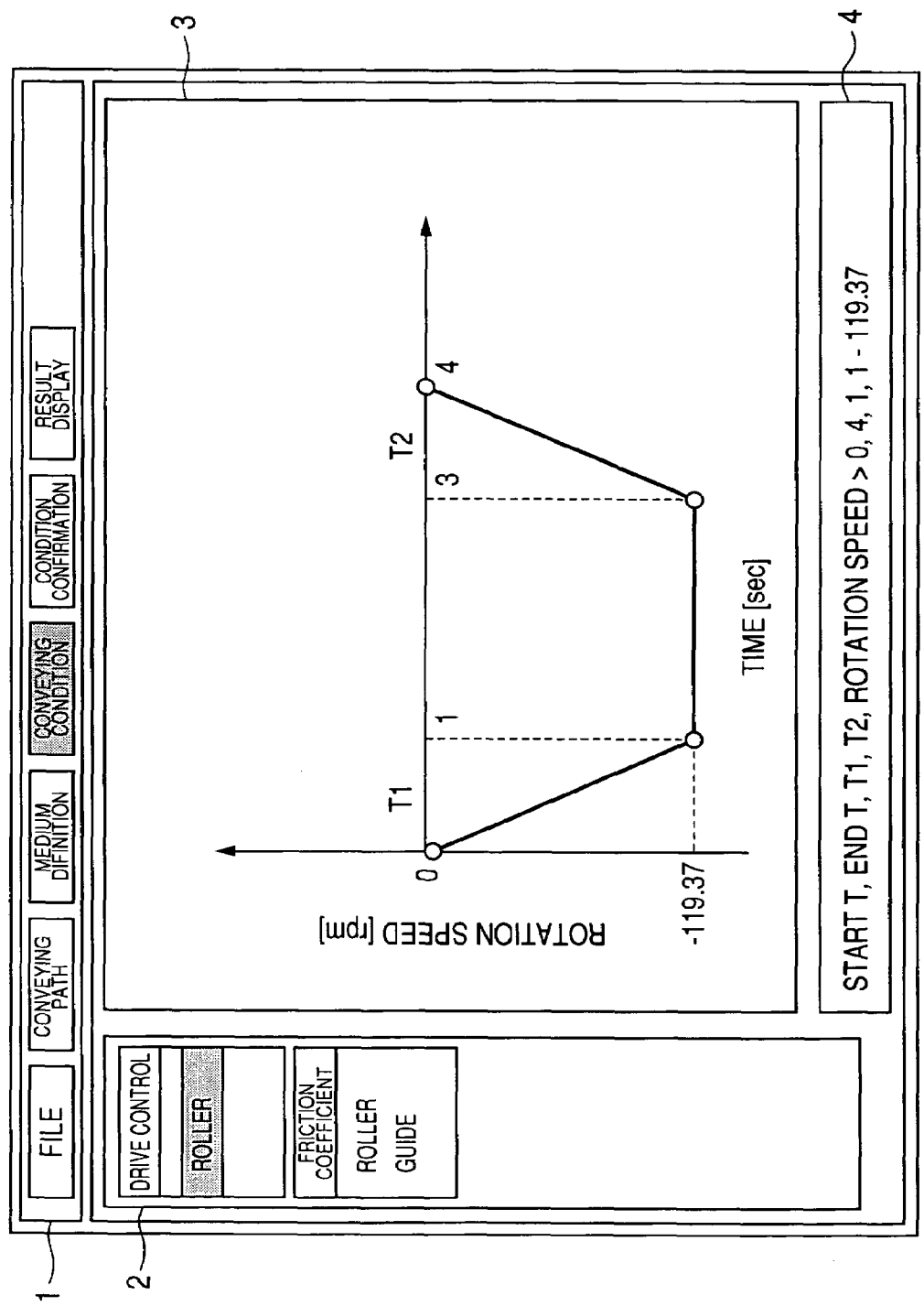
FIG. 6 is an illustrative diagram of a control operation in the conveying condition definition step.

As shown in FIG. 6, as "0", "4", "1", "1" and "−119.37" are entered as the start T, end T, T1, T2 and rotation speed, respectively in the command field 4, the time sequential drive conditions of the driving roller 36a can be graphically displayed on the graphic screen 3.

In the graphical display of this embodiment, the characteristic points are input in such a manner that the rotation speed of the roller is increased linearly and clockwise from 0 to 119.37 rpm in one second after the rise time 0, during the period from first second to third second a rotation speed of 119.37 rpm is maintained, and the rotation speed is lowered to 0 rpm at the fourth second after a fall time of one second, i.e., the rotation speed is reduced from 119.37 rpm to 0 during the period from third second to fourth second.

In the similar manner, the conveying conditions for time sequential drive can be set to each of other driving rollers.

In addition to the drive condition setting, description will be made on typical friction coefficient definition in the conveying condition setting step 103.

Figure 7:
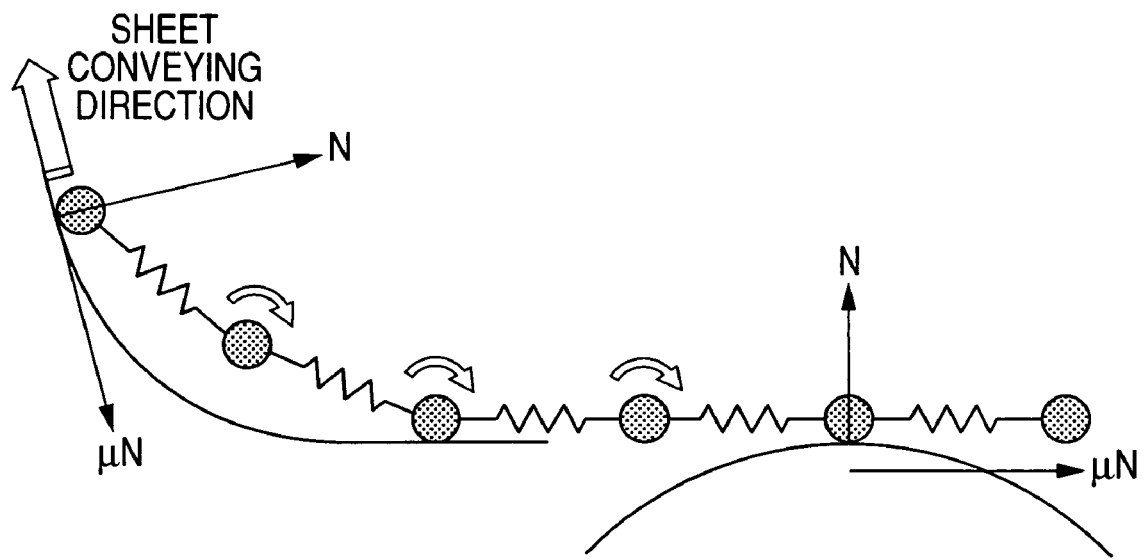
FIG. 7 is an illustrative diagram of a friction coefficient setting operation in the conveying condition definition step.

Also for friction coefficient definition, in the state that a "friction coefficient" in the subsidiary structure menu 2 for the drive condition is selected, each roller or guide displayed on the graphic screen 3 of FIG. 5 is selected and a friction coefficients μ of a sheet relative to the selected roller or guide is input to the command field 4. As shown in FIG. 7, a friction force μN is imparted in a direction opposite to the sheet conveying direction, where N is a vertical drag obtained through calculation of a contact between the mass point of the flexible medium and the roller or guide. With the above-described processes, setting a simulation model to be subjected to motion calculation is completed.

Next, description will be made on the algorithm of the conveying condition preview display step 104.

(Rotation Direction Display Step)

First, with reference to FIGS. 8 to 11, description will be made on a rotation direction display step 104(a) of displaying a roller rotation direction.

FIGS. 8 to 11 are enlarged views of the roller pair to which conveying conditions were set with reference to FIG. 5. Drive conditions are set to the lower roller 36a, and not set to the opposing driven roller 36b.

Figure 8:
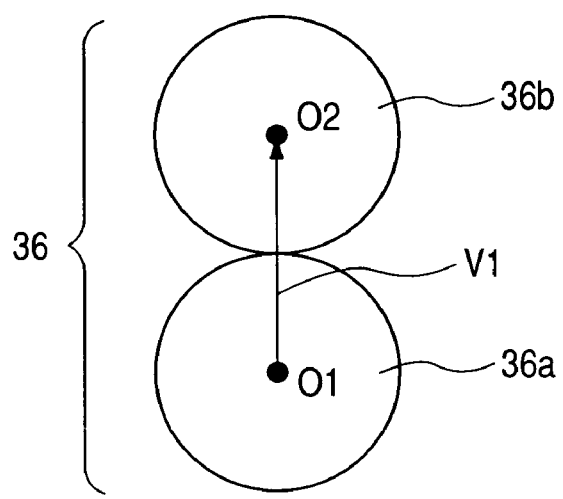
FIG. 8 is an illustrative diagram of a rotation direction display step of the present invention.

Step 1: A vector V1 coupling the center O1 of the driving roller 36a and the center O2 of the driven roller 36a is calculated from the coordinate values of the roller pair (FIG. 8).

Figure 9:
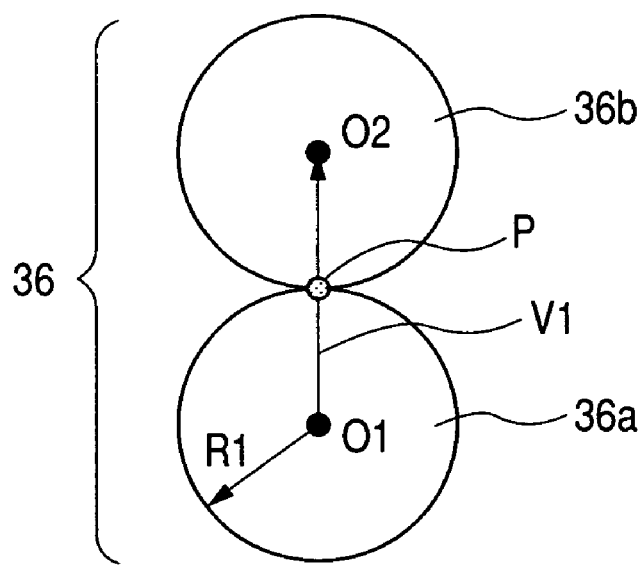
FIG. 9 is an illustrative diagram of the rotation direction display step of the present invention.

Step 2: Cross point coordinate values P between the driving roller 36a and driven roller 36b are calculated from a radius R1 of the driving roller 36a, the center O1 of the driving roller 36a and the vector V1 (FIG. 9).

Figure 10:
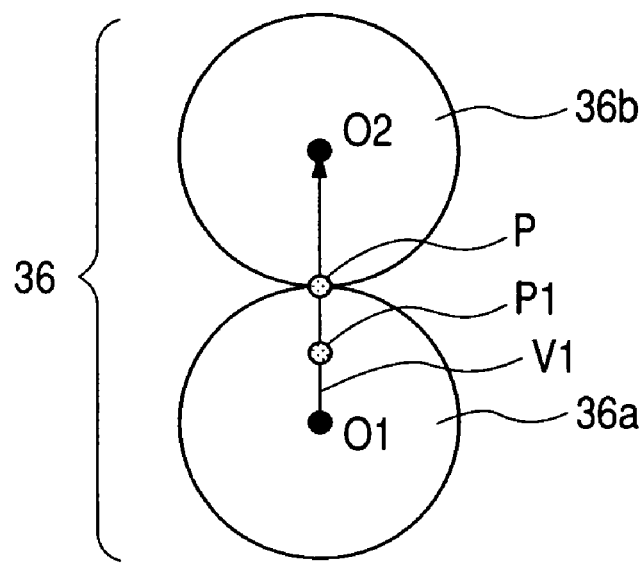
FIG. 10 is an illustrative diagram of the rotation direction display step of the present invention.

Step 3: A write reference P1 for an arrow indicating a rotation direction is calculated in such a manner that O1−P1: P1−P takes a predetermined ratio. In this embodiment, the reference P1 is represented by a middle point with a ratio of 1:1 (FIG. 10).

Figure 11:
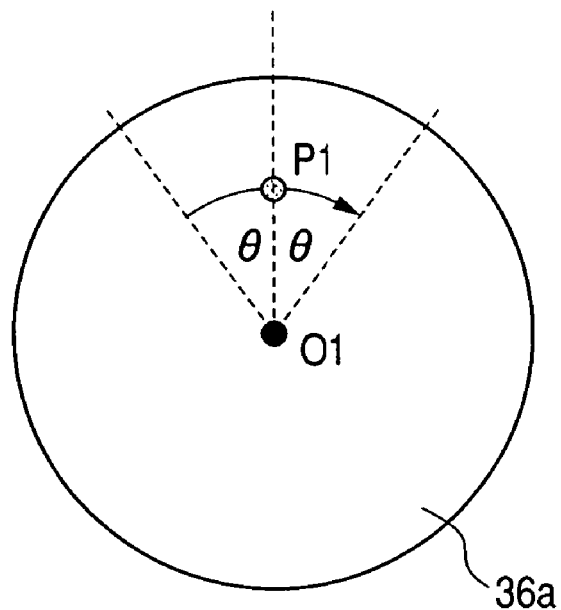
FIG. 11 is an illustrative diagram of the rotation direction display step of the present invention.

Step 4: An arc having O1 as a center is drawn right and left by a predetermined angle θ by using P1 as the reference. An arrowhead of an arrow indicating a rotation direction is added at the arc end. The rotation direction is obtained at each designated time in accordance with the sign of time sequential roller rotation speed input values (FIG. 11).

(Peripheral Speed Display Step]

Figure 12:
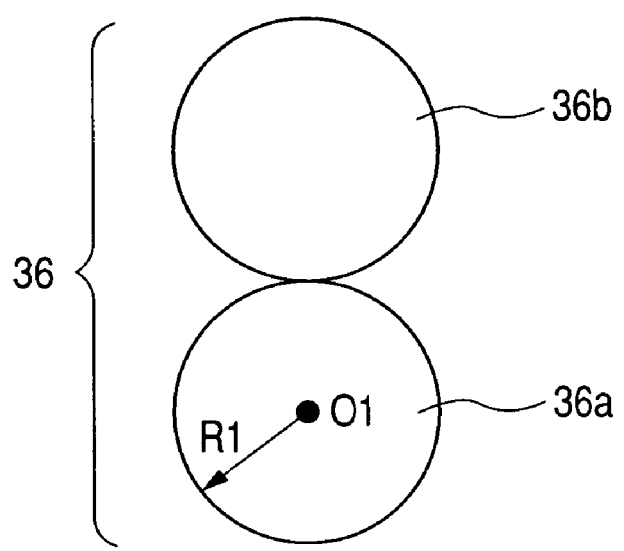
FIG. 12 is an illustrative diagram of a peripheral speed display step according to a first embodiment.
Figure 13:
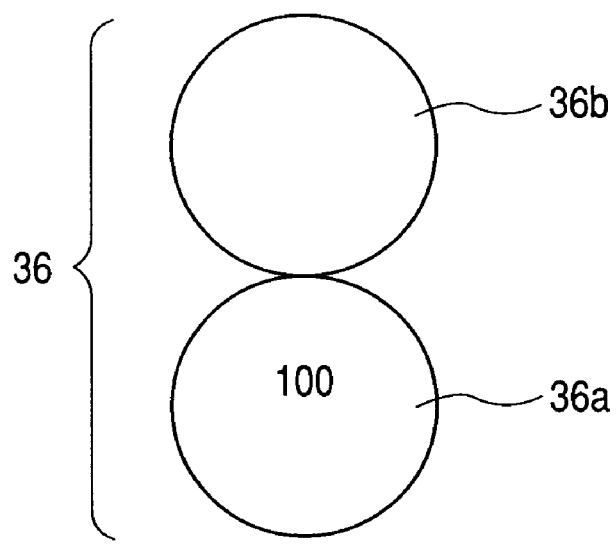
FIG. 13 is an illustrative diagram of the peripheral speed display step of the first embodiment.

Next, with reference to FIGS. 12 and 13, description will be made on a peripheral speed display step 104(b) of displaying a roller peripheral speed.

Step 1: The coordinate values of the center O1 of the driving roller 36a are defined as a numerical value write reference for displaying a numerical value of a roller peripheral speed (FIG. 12).

Step 2: A roller peripheral speed is calculated from the radius R1 of the driving roller 36a and the roller rotation speed. The roller peripheral speed is calculated at each designated time in accordance with the time sequential roller rotation speed input values. In this embodiment, a roller peripheral speed of 2×8×Π×|−119.37|/60=100 mm/s can be obtained from the roller radius of 8 nm and the roller rotation speed of −119.37 rpm.

Step 3: The roller peripheral values obtained at Step 2 are time sequentially drawn using O1 as the reference (FIG. 13).

Figure 14:
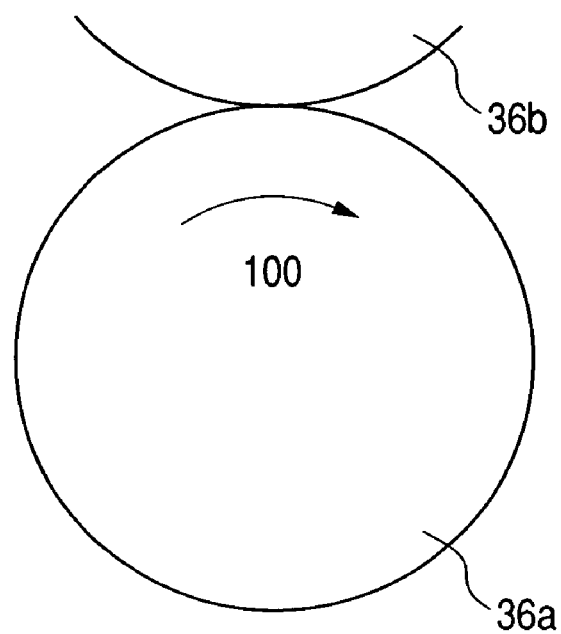
FIG. 14 is an illustrative diagram of the peripheral speed display step of the first embodiment.

As the arrow obtained by the rotation direction display step 104(a) and the peripheral speed obtained by the peripheral speed display step 104(b) are drawn on the same time axis, a sheet conveying direction and a sheet conveying speed near a roller nip portion corresponding to a conveying portion can be indicated for a roller pair as shown in FIG. 14.

Next, description will be made on a user operation method for the conveying condition preview display step 104.

Figure 15:
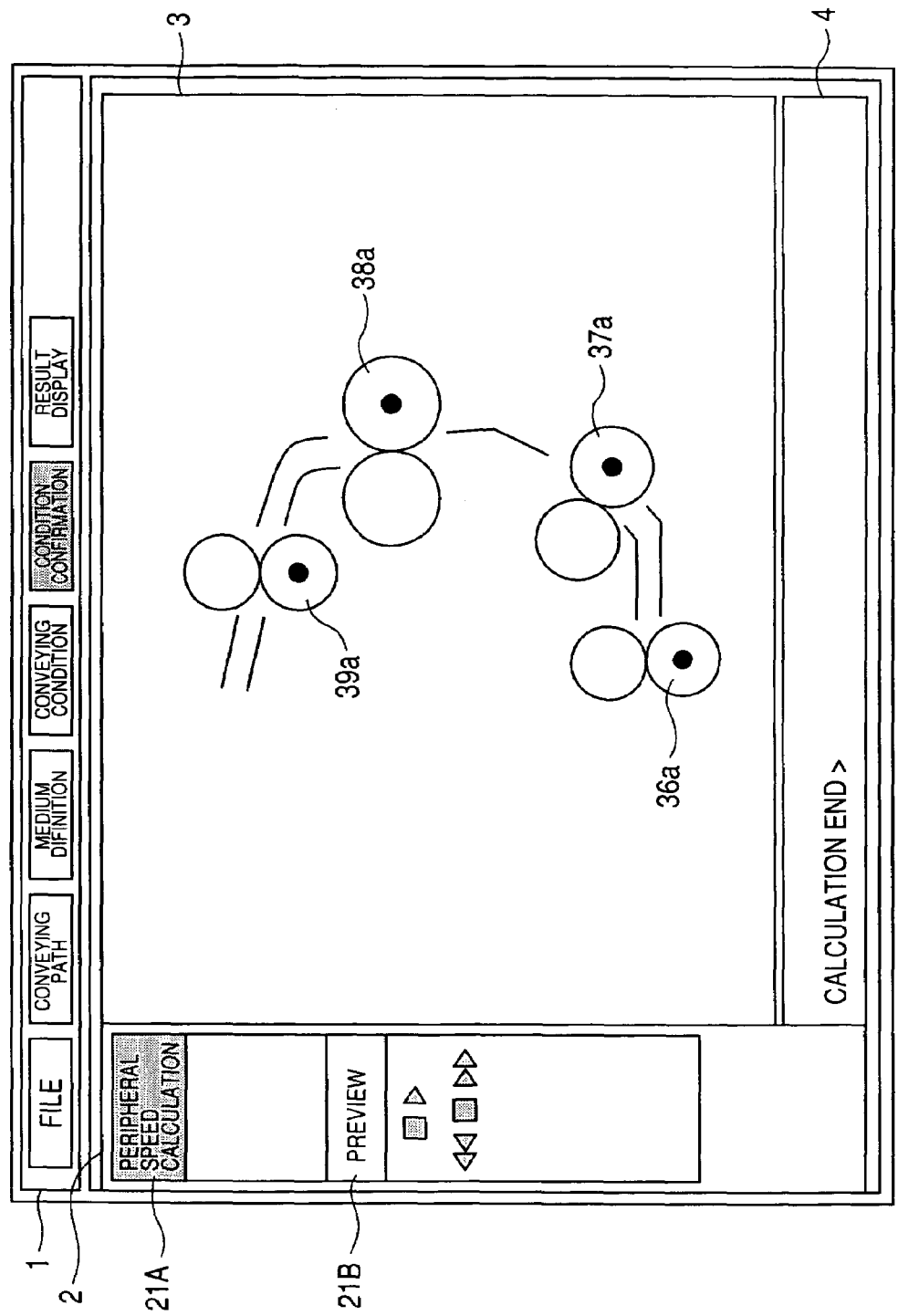
FIG. 15 is an illustrative diagram of a peripheral speed calculation operation in a conveying condition preview display step.

As shown in FIG. 15, as a "condition confirmation" button of the menu bar 1 is depressed to display a conveying condition preview, a "peripheral speed calculation" 21A is displayed in the subsidiary configuration menu 2.

As this button is clicked and selected, the maximum value of characteristic points is detected from all the driving rollers 36a, 37a, 38a and 39a defined in the simulation model, and the rotation directions and peripheral speeds are calculated for all the driving rollers on the downstream side of the driving roller having the maximum value. These calculations are performed by using a computer function of the design support system so that the time sequential rotation directions and peripheral speeds of the driving rollers can be calculated at once. The calculation results are stored in the storage device of the design support system.

Figure 16:
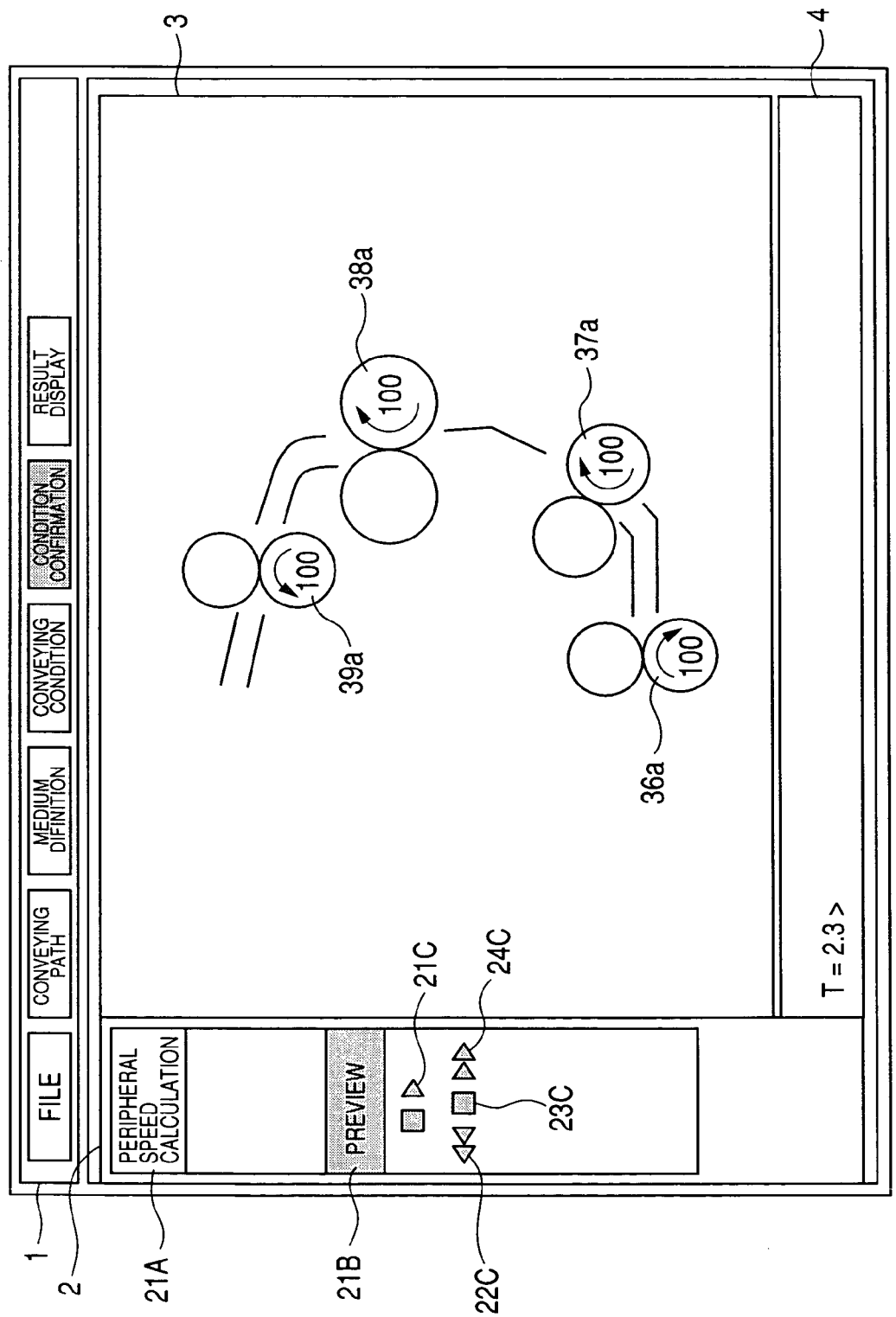
FIG. 16 is an illustrative diagram of an operation in the conveying condition preview display step.

After it is confirmed that a character string "calculation end >" is displayed in the command field 4, a preview 21B in the subsidiary configuration menu 2 is selected. As a play button 21C is clicked, the time sequential rotation directions and sheet conveying speeds of the driving rollers are continuously displayed on the graphic screen 3 as shown in FIG. 16, to the end time input as the driving roller characteristic point.

During this continuous display, a time when data is displayed on the graphic screen 3 is displayed in the command field 4. If it is desired to confirm only the driving conditions at a certain time, after the play button 21C is clicked for continuous display, a pose button 23C may be clicked or a desired time may be input directly to the command field 4. A rewind button 22C and a fast feed button 24C may be used to control the display as desired so that the drive state confirmation effects can be improved.

With the above-described operations, it becomes possible to understand visually, relatively or intuitively which roller is to be driven among all rollers drawn in the simulation model, in the range of the drive setting time. It is also possible to understand visually, relatively or intuitively to which direction the sheet is conveyed along the conveying path near the roller nip portion and what is the speed at that time.

Figure 17:
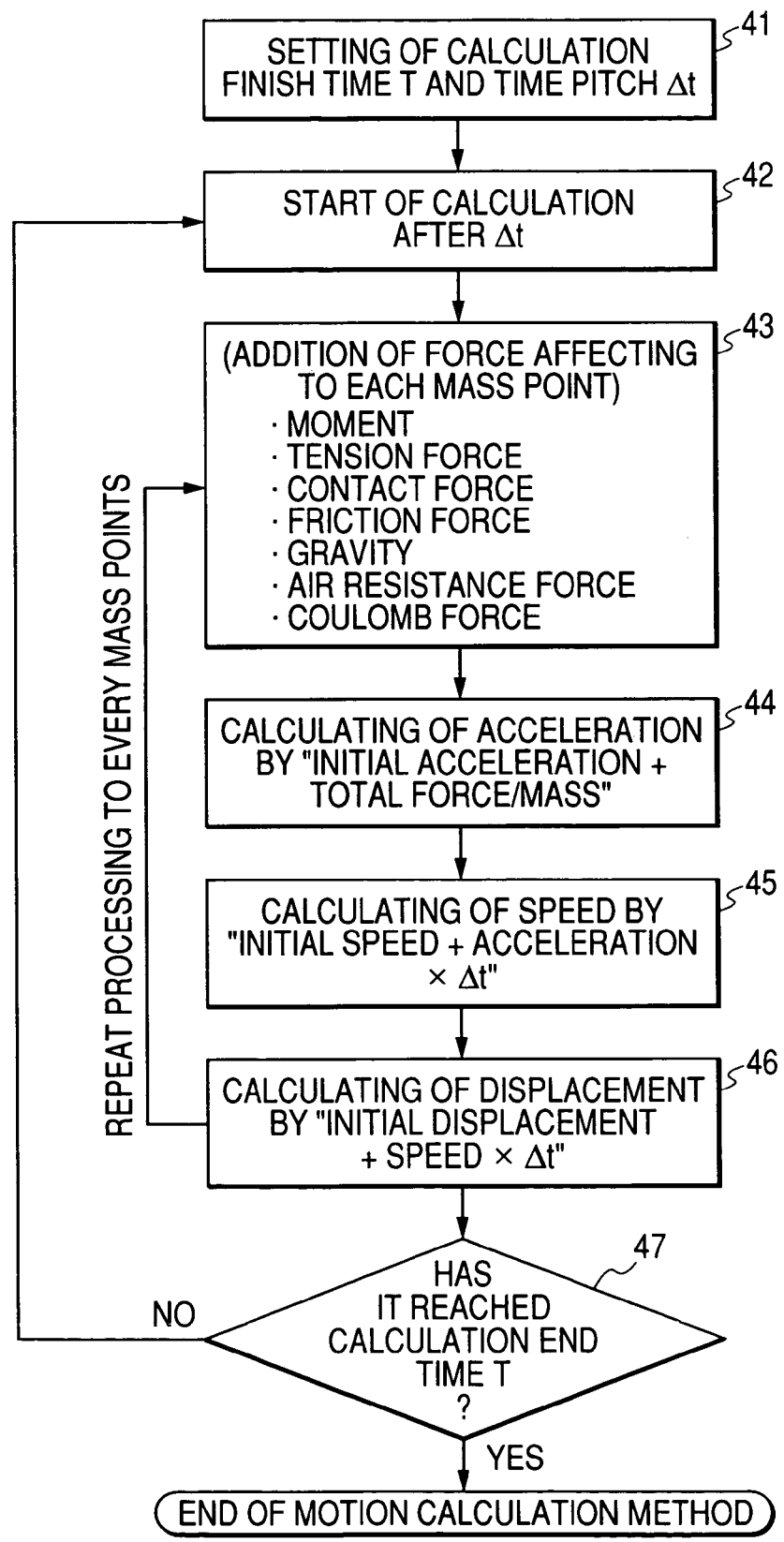
FIG. 17 is a flow chart illustrating a motion calculation step.

Next, with reference to the flow chart shown in FIG. 17, description will be made on an example of the motion calculation step 105 of calculating a motion. First, a block 41 sets a calculation finish time T and a time pitch Δt. The calculation finish time T is the time when calculation of a motion of a flexible medium is terminated, and the time pitch Δt is a time pitch of numerical time integral for numerically solving a motion equation.

Blocks 42 to 47 are a loop of numerical time integral. The motion of the flexible medium is calculated at the time pitch Δt starting from the calculation start time and the calculation results are stored in the storage unit.

The block 42 sets an initial acceleration, an initial speed and an initial displacement necessary for calculation after Δt second. These values are replaced with the calculation results after one cycle (namely, the calculation results of the previous cycle are used as the initial values).

The block 43 defines forces acting upon each mass point constituting the flexible medium. The forces include a rotation moment, a tension force, a contact force, a friction force, a gravity, an air resistance force, and a coulomb force. A total sum of forces applied to each mass point is defined as the force eventually applied to the flexible medium.

The block 44 calculates the acceleration after Δt second by dividing the force applied to the mass point calculated by the block 43 by a mass of the mass point and then adding the initial acceleration.

Similarly, the block 45 calculates the speed and the block 46 calculates the displacement.

In this embodiment, although an Euler time integral method is used for the physical amount calculations at the time pitch Δt second, other time integral methods may also be adopted such as a Kutta-merson method, Newmark-β method and a Willson-θ method. The block 47 judges whether the present time is the calculation end time T set by the block 41. If the present time is the calculation end time T, the motion calculation step 105 is terminated, whereas if not, the flow returns to the block 42 to repeat the time integral.

Figure 18:
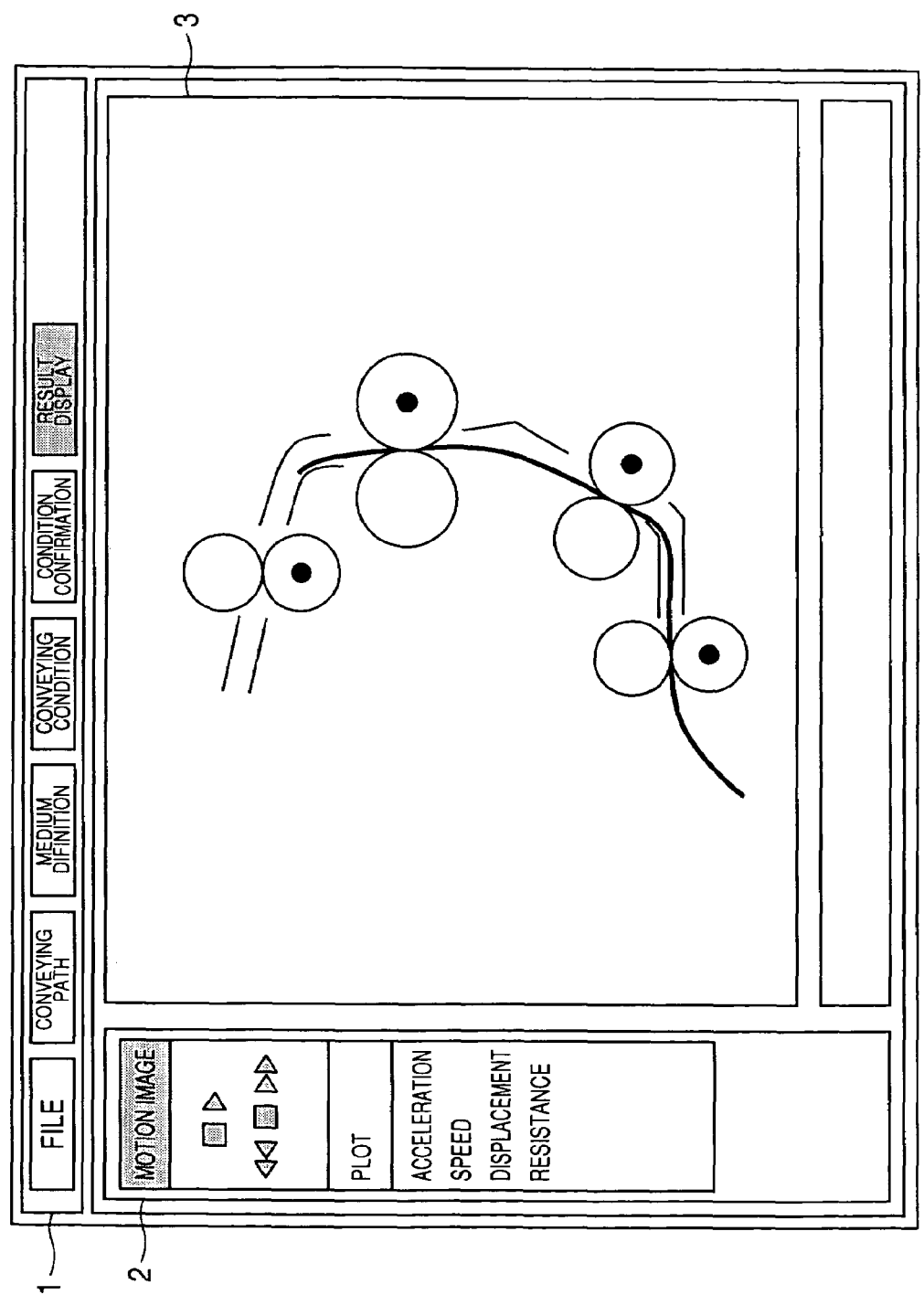
FIG. 18 is an illustrative diagram of a moving image menu in a result display step.

In the result display step 106, as a "result display" button in the menu bar 1 is depressed, a moving image menu and a plot menu are displayed in the subsidiary configuration menu 2. FIG. 18 shows an example of a moving image screen of the embodiment. The subsidiary configuration menu 2 is structured so that a moving image and a plot are selected mainly. Moving image menu buttons are similar to those shown in FIG. 16. By using these buttons, the behavior of the flexible medium can be visualized on the graphic screen 3.

Figure 19:
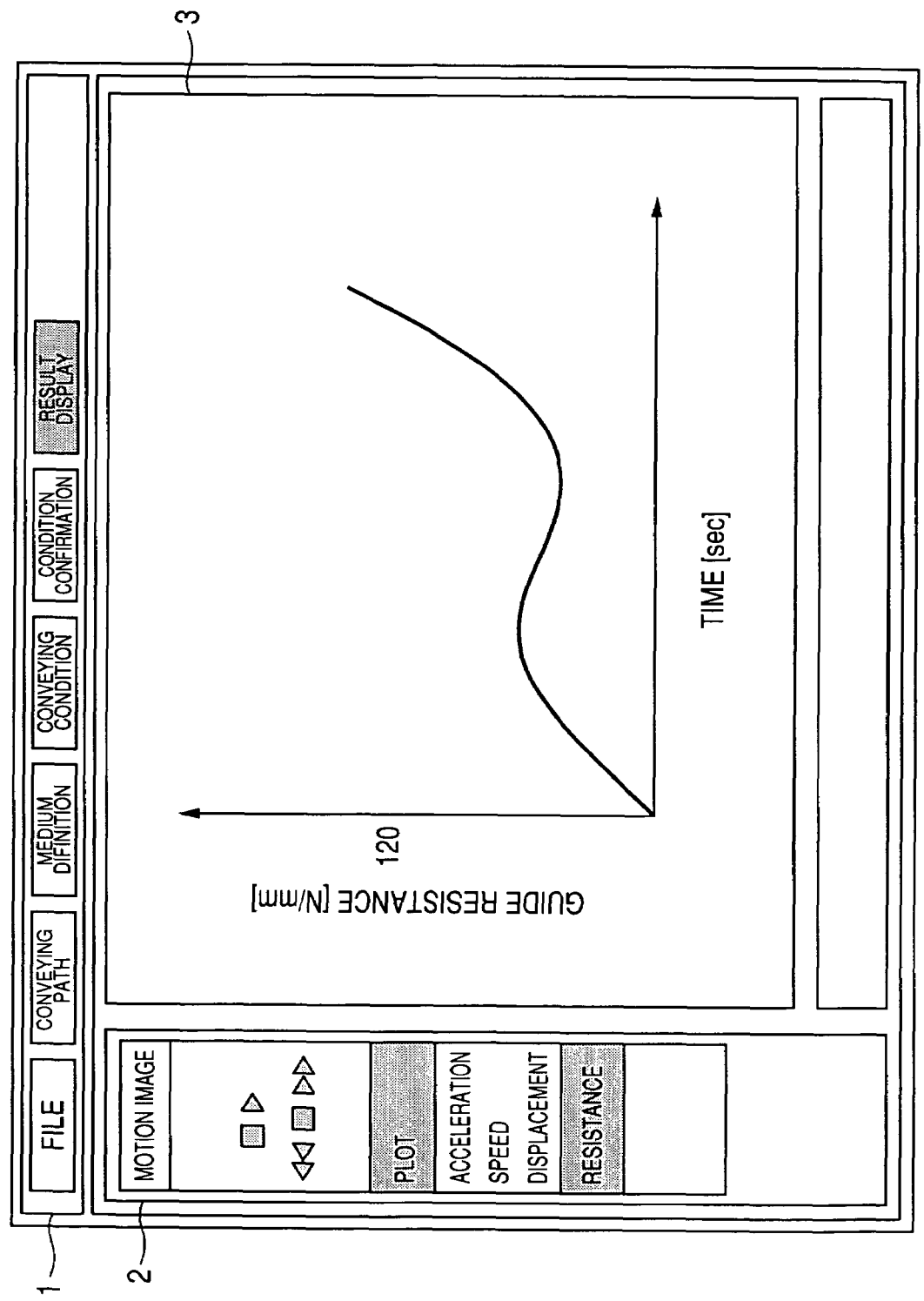
FIG. 19 is an illustrative diagram of a plot menu in the result display step.

FIG. 19 shows an example of the plot screen of the embodiment. As the calculation results to be drawn in a graph is selected from the plot menu, a time sequential graph is displayed on the graphic screen 3. In this example, a reverse force applied to a desired guide is plotted.

The flow sequence of the design support method of the embodiment has been described above, in the order of the conveying path definition step 101, flexible medium model preparation step 102, conveying condition setting step 103, conveying condition preview display step 104, motion calculation step 105 and result display step 106.

According to the embodiment, in the conveying condition preview display step, the conveying direction is displayed by an arrow and the roller peripheral speed is displayed as a sheet conveying speed converted from a roller rotation speed. It is therefore possible to confirm easily the driving condition settings of a simulation model before numerical integral calculations. The number of model analysis steps to be caused by a driving condition input error can be reduced greatly and design of various conveying paths can be made efficiently.

Second Embodiment

Figure 20:
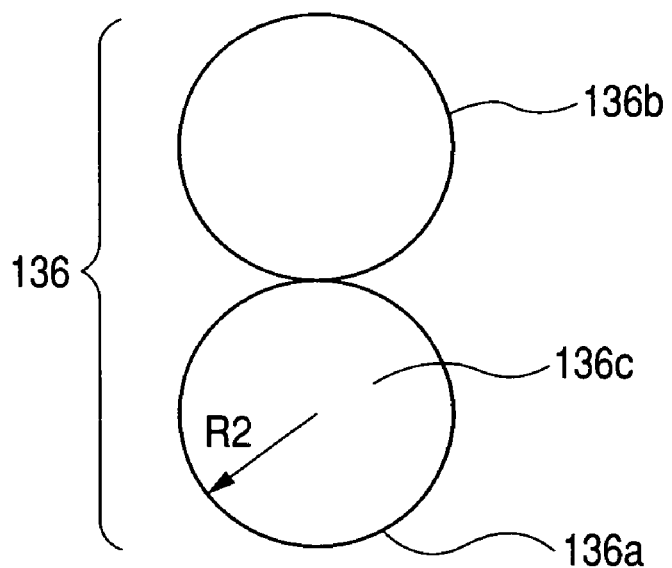
FIG. 20 is an illustrative diagram of a peripheral speed display step according to a second embodiment.
Figure 21:
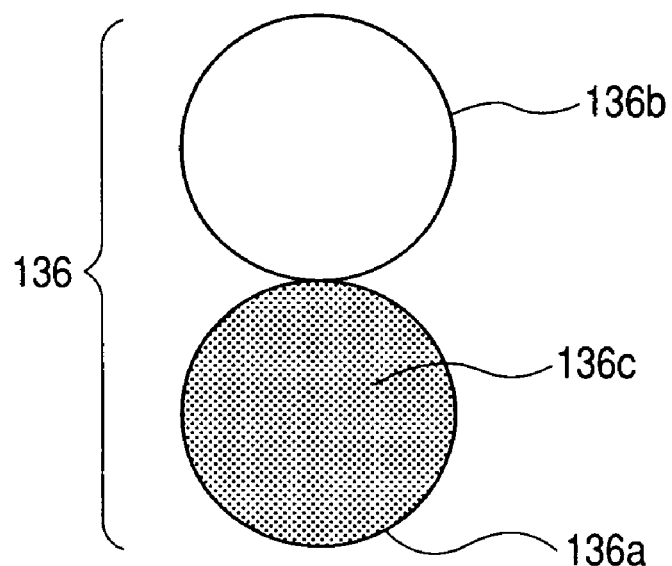
FIG. 21 is an illustrative diagram of the peripheral speed display step of the second embodiment.
Figure 22:
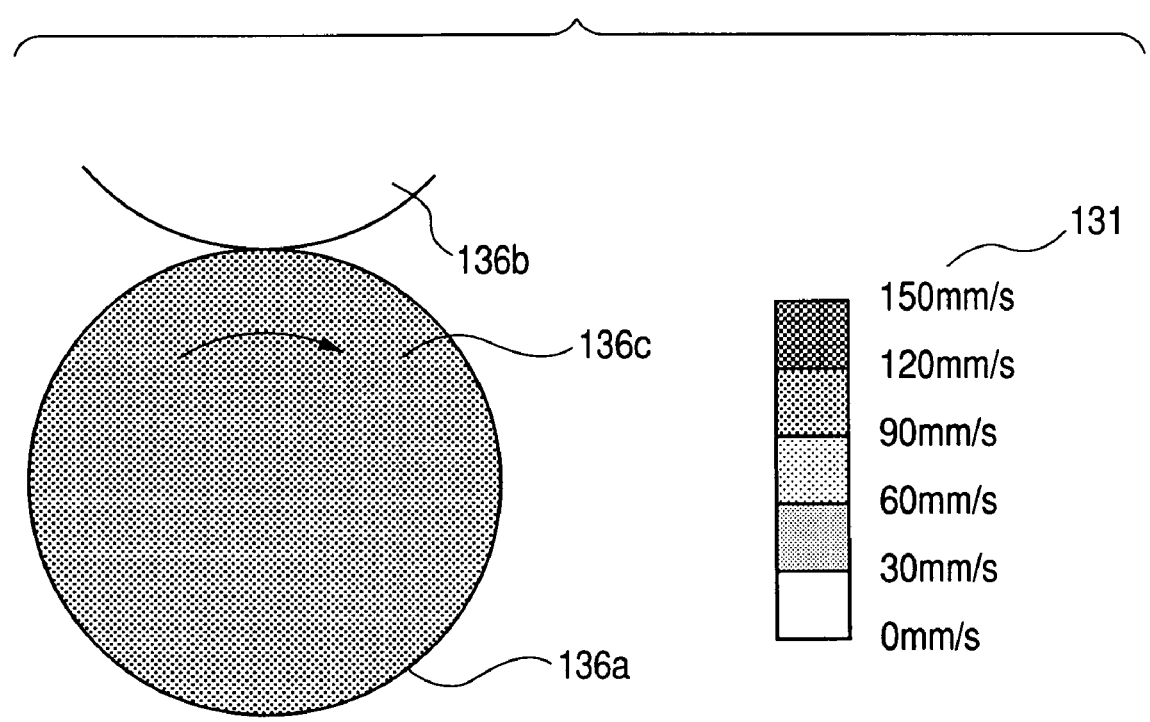
FIG. 22 is an illustrative diagram of the peripheral speed display step of the second embodiment.

Next, with reference to FIGS. 20 to 22, description will be made on the conveying condition preview display step 104 according to the second embodiment.

The algorithm for displaying the roller rotation direction is the same as that of the first embodiment described with reference to FIGS. 8 to 11, and the flow sequence of steps other than the peripheral speed display step 140($b$) is the same as that of the first embodiment, and the description thereof is omitted. The peripheral speed display step 104($b$) of the second embodiment will be described.

(Peripheral Speed Display Step)

Step 1: The inner area enclosed by a circle of a driving roller 136$a$ is defined as a tonal solid area 136$c$ in which a roller peripheral speed is displayed in a tonal manner (FIG. 20).

Step 2: A roller peripheral speed is calculated from a radius R2 of the driving roller 136$a$ and the roller rotation speed. The roller peripheral speed is calculated at each designated time in accordance with the time sequential roller rotation speed input values. In this embodiment, a roller peripheral speed of 2×8×Π×|−119.37|/60=100 mm/s can be obtained from the roller radius of 8 nm and the roller rotation speed of −119.37 rpm.

Step 3: The maximum value V of the roller peripheral speed obtained at Step 2 is detected from all driving rollers defined in the simulation model. In this embodiment, the maximum value V is assumed to be 150 mm/s.

Step 4: A tonal width of each tonal level is decided as V/n where n is a tonal number. In this embodiment, the tonal width of each tonal level is 30 mm/s by setting n=5.

Step 5: The tonal solid area 136$c$ is drawn solid with a tonal level corresponding to the roller peripheral speed changing with time (FIG. 21).

Figure 23:
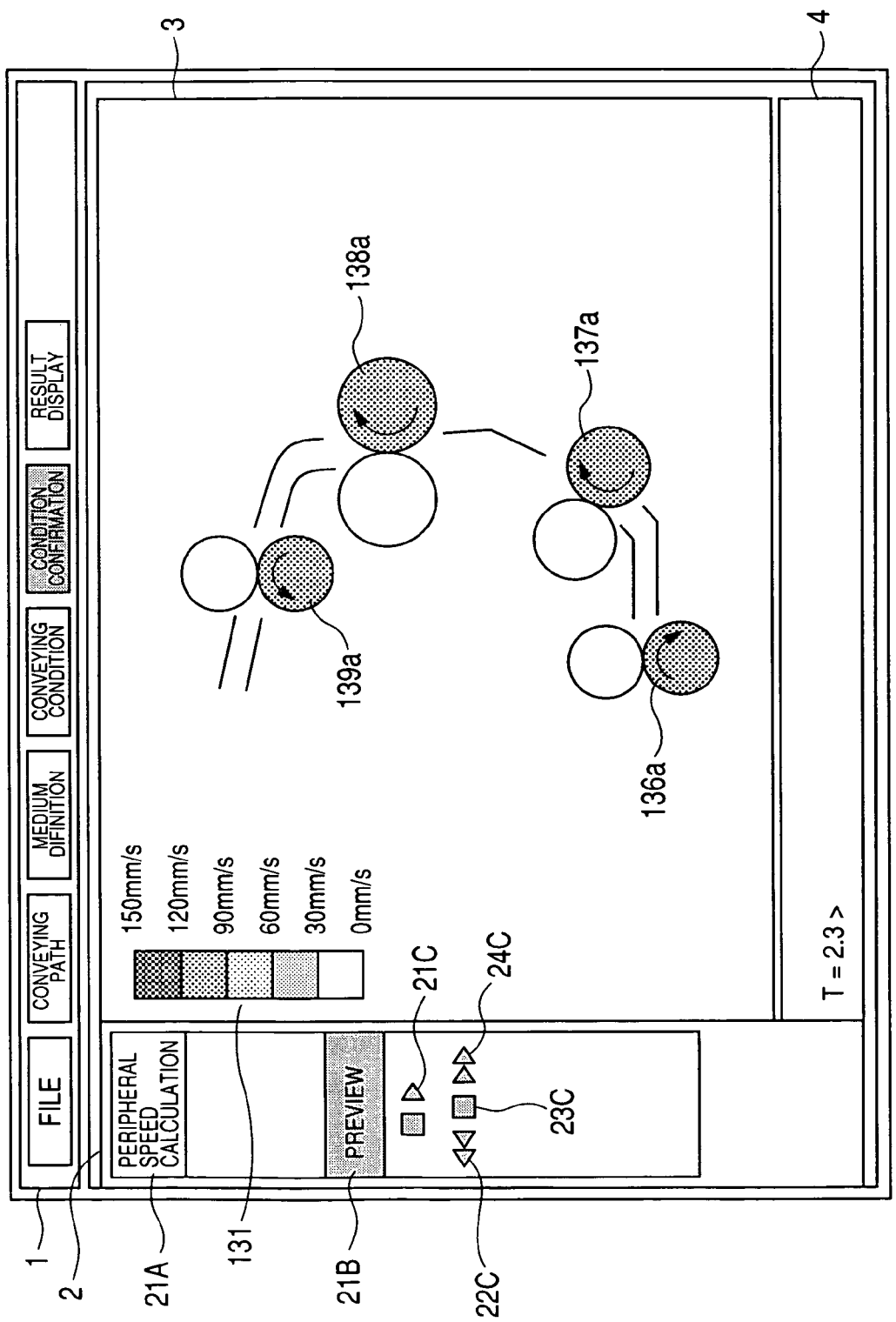
FIG. 23 is an illustrative diagram of an operation in a second conveying condition preview display step.

The arrow obtained by the rotation direction display step 104($a$) of the first embodiment and the tonal level obtained by the peripheral speed display step 104($b$) of the second embodiment are drawn on the same time axis. It is therefore possible to visually express the sheet conveying direction near the nip portion corresponding to the conveying portion and the sheet conveying speed in each tonal width, as shown in FIGS. 22 and 23. In FIGS. 22 and 23, reference numeral 131 represents tonal distribution information, and the tonal distribution on the basis of the result of Step 4 is displayed to indicate the roller peripheral speed range of each tonal level.

In this embodiment, although the number of dots per unit area is used as a tonal display method, another density tonal display method or a color tonal display method may also be used.

According to the second embodiment, in the conveying condition preview display step 104, the conveying direction is displayed by an arrow and the roller peripheral speed is displayed as a tonal distribution by using a sheet conveying speed converted from a roller rotation speed. It is therefore possible to confirm visually and intuititively the driving condition settings.

Figure 24:
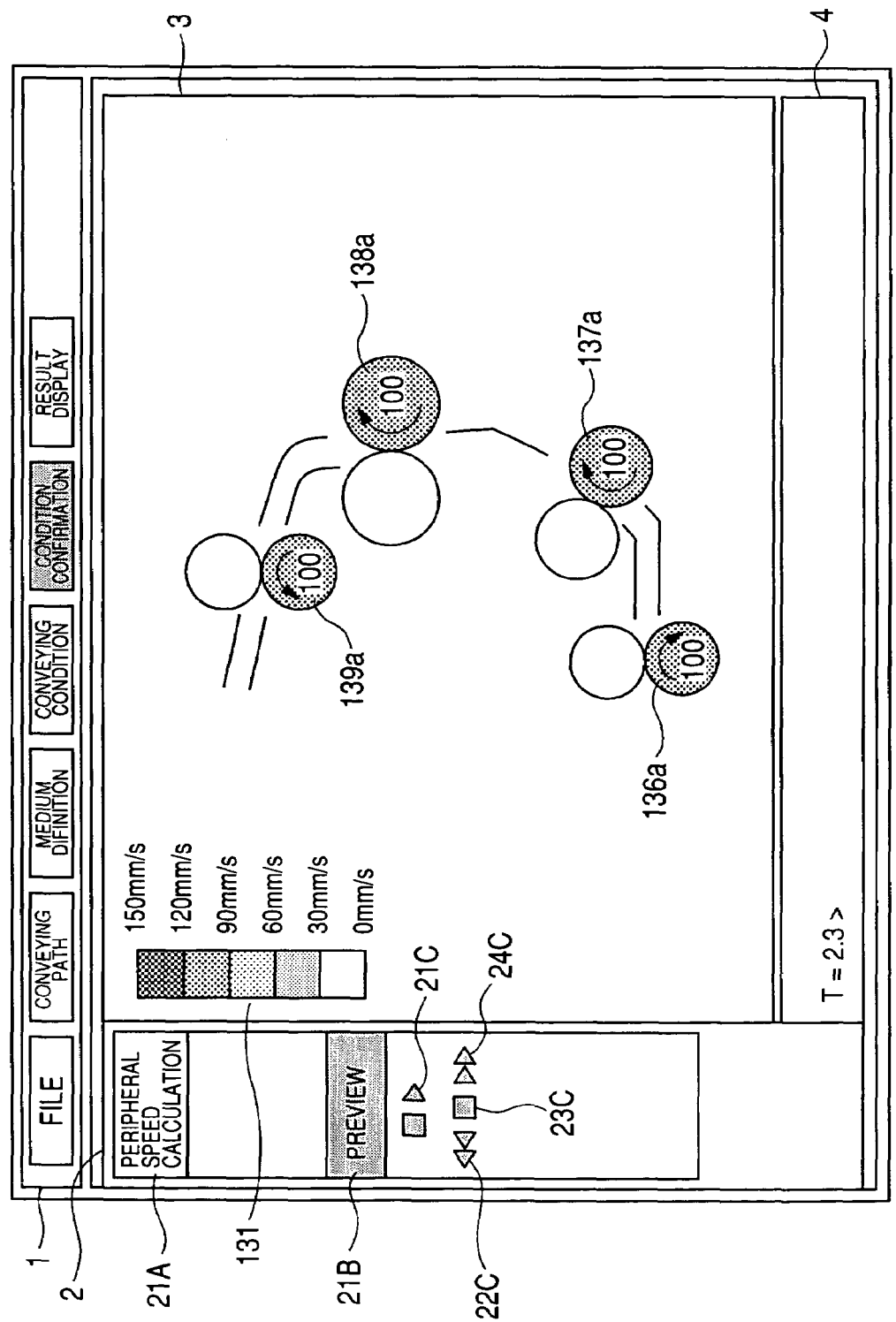
FIG. 24 is an illustrative diagram of an operation in a third conveying condition preview display step.

FIG. 24 shows an example using a numerical value display of the roller peripheral speed by the first embodiment and a tonal distribution display of the roller peripheral speed by the second embodiment. It is obvious from the description of the algorithm of each embodiment that both the steps can be used at the same time. In this example, a roller peripheral speed can be roughly and sensually understood from the tonal distribution display of the second embodiment, and the numerical value of the roller peripheral speed of the first embodiment can be referred to if a precise roller peripheral speed is desired to be confirmed.

Third Embodiment

The third embodiment will be described with reference to FIG. 25. FIG. 25 shows an animated display of the behavior of a flexible medium on the graphic screen 3, using the moving image menu of the result display step 106 of the first embodiment described with reference to FIG. 18. As the "moving image" button in the subsidiary configuration menu 2 is clicked, displayed is the time sequential behavior of a flexible medium obtained through calculations by the motion calculation step. At the same time, the time sequential roller driving conditions obtained by the algorithms of the first and second embodiments in the conveying condition preview display step 104 are displayed on the graphic screen 3 on the same time axis in an animated manner.

The degree of understanding and confirming the behavior of a flexible medium can be improved by drawing the driving condition preview display results in combination with the behavior display of the flexible medium in the result display step 106. For example, it becomes easy to judge whether a sheet is conveyed because of roller rotation or a sheet is slipped and conveyed by other rollers on the upstream and downstream sides, although the subject rollers are stopped.

This application claims priority from Japanese Patent Application No. 2004-292604 filed on Oct. 5, 2004, which is hereby incorporated by reference herein.

What is claimed is:

1. A design support method of designing a conveying path by simulating a behavior of a sheet-like flexible medium to be conveyed along a conveying path, the method comprising:
   a conveying condition setting step of setting drive conditions of conveying rollers for conveying said flexible medium;
   a rotation direction display step of displaying rotation directions of said conveying rollers set with the drive conditions by said conveying condition setting step;
   a peripheral speed display step of displaying peripheral speeds of said conveying rollers set with the drive conditions by said conveying condition setting step;
   a motion calculation step of acquiring sequentially the behavior of said flexible medium in accordance with said drive conditions of said conveying rollers set by said conveying condition setting step; and
   a conveying condition preview display step of collectively displaying, before said motion calculation step, the rotation directions and peripheral speeds of said conveying rollers to be displayed by said rotation direction display step and said peripheral speed display step.

2. The design support method according to claim 1, further comprising a conveying path definition step of defining information on a shape of said conveying roller and information on a shape of a conveying guide.

3. The design support method according to claim 1, further comprising a flexible medium model preparation step of expressing said flexible medium as an elastic body by dividing said flexible medium into a plurality of rigid elements having a mass and coupling said rigid elements by springs.

4. The design support method according to claim 1, further comprising a result display step of displaying a behavior of said flexible medium obtained by said motion calculation step.

5. The design support method according to claim 4, wherein in said result display step, time sequential information on the rotation directions and peripheral speeds of said conveying rollers is displayed in parallel to the behavior of said flexible medium, relative to said conveying rollers set with the driving conditions by said conveying condition setting step.

6. The design support method according to claim 1, wherein said rotation direction display step displays an arrow near a nip portion of said conveying rollers as a rotation direction.

7. A design support method of designing a conveying path by simulating a behavior of a sheet-like flexible medium to be conveyed along a conveying path, the method comprising:
   a conveying condition setting step of setting drive conditions of conveying rollers for conveying said flexible medium;
   a rotation direction display step of displaying rotation directions of said conveying rollers set with the drive conditions by said conveying condition setting step;
   a peripheral speed display step of displaying peripheral speeds of said conveying rollers set with the drive conditions by said conveying condition setting step; and
   a motion calculation step of acquiring sequentially the behavior of said flexible medium in accordance with said drive conditions of said conveying rollers set by said conveying condition setting step,
   wherein said peripheral speed display step displays a numerical value near a nip portion of said conveying rollers as a peripheral speed.

8. A design support method of designing a conveying path by simulating a behavior of a sheet-like flexible medium to be conveyed along a conveying path, the method comprising:
   a conveying condition setting step of setting drive conditions of conveying rollers for conveying said flexible medium;
   a rotation direction display step of displaying rotation directions of said conveying rollers set with the drive conditions by said conveying condition setting step;
   a peripheral speed display step of displaying peripheral speeds of said conveying rollers set with the drive conditions by said conveying condition setting step; and
   a motion calculation step of acquiring sequentially the behavior of said flexible medium in accordance with said drive conditions of said conveying rollers set by said conveying condition setting step,
   wherein said peripheral speed display step displays said conveying rollers in a tonal manner in accordance with information on a peripheral speed of said conveying rollers.

9. The design support method according to claim 8, wherein said peripheral speed display step displays said conveying rollers in a tonal manner in accordance with information on the peripheral speed of said conveying rollers, by calculating a tonal width of one tone from an arbitrary set tonal number and a maximum value of the information on the peripheral speed of said conveying rollers.

10. The design support method according to claim 8, wherein said peripheral speed display step displays said conveying rollers in a tonal manner by changing a dot number per unit area.

11. The design support method according to claim 8, wherein said peripheral speed display step displays said conveying rollers in a color tonal manner.

12. A computer-readable medium storing a computer program, which when executed, causes a computer to design a conveying path by simulating a behavior of a sheet-like flexible medium to be conveyed along a conveying path, the computer program comprising:

a conveying condition setting instruction for setting drive conditions of conveying rollers for conveying said flexible medium;

a rotation direction display instruction for displaying rotation directions of said conveying rollers set with the drive conditions in said conveying condition setting instruction;

a peripheral speed display instruction for displaying peripheral speeds of said conveying rollers set with the drive conditions in said conveying condition setting step;

a motion calculation instruction for acquiring sequentially the behavior of said flexible medium in accordance with said drive conditions of said conveying rollers set in said conveying condition setting instruction; and a conveying condition preview display instruction for collectively displaying, before said motion calculation instruction, the rotation directions and peripheral speeds of said conveying rollers to be displayed in said rotation direction display instruction and said peripheral speed display instruction.

* * * * *